US012469941B2

(12) United States Patent
Steffe'

(10) Patent No.: US 12,469,941 B2
(45) Date of Patent: Nov. 11, 2025

(54) FULLY-RECONFIGURABLE COAXIAL FILTER

(71) Applicant: Thales Alenia Space Italia S.p.A. Con Unico Socio, Rome (IT)

(72) Inventor: Walter Steffe', Rome (IT)

(73) Assignee: Thales Alena Space Italia S.P.A. Con Unico Socio, Rome (IT)

( * ) Notice: Subject to any disclaimer, the term of this patent is extended or adjusted under 35 U.S.C. 154(b) by 166 days.

(21) Appl. No.: 18/574,430

(22) PCT Filed: Jul. 1, 2022

(86) PCT No.: PCT/IB2022/056150
§ 371 (c)(1),
(2) Date: Dec. 27, 2023

(87) PCT Pub. No.: WO2023/275844
PCT Pub. Date: Jan. 5, 2023

(65) Prior Publication Data

US 2024/0291126 A1 Aug. 29, 2024

(30) Foreign Application Priority Data

Jul. 2, 2021 (IT) ........................ 102021000017498

(51) Int. Cl.
*H01P 1/202* (2006.01)
*H01P 1/20* (2006.01)
(Continued)

(52) U.S. Cl.
CPC .............. *H01P 1/20* (2013.01); *H01P 1/2053* (2013.01); *H01P 7/04* (2013.01)

(58) Field of Classification Search
CPC ........ H01P 1/202; H01P 1/205; H01P 1/2053; H01P 1/208; H01P 1/207; H01P 1/20; H01P 1/201; H01P 7/04; H01P 7/06; H01P 7/00
(Continued)

(56) References Cited

U.S. PATENT DOCUMENTS 4,320,368 A * 3/1982 Sekiguchi ............. H01P 1/2053 333/209
6,005,455 A 12/1999 Lindell et al.
(Continued)

FOREIGN PATENT DOCUMENTS

EP 3667810 A1 6/2020

OTHER PUBLICATIONS

Italian Search Report dated Feb. 28, 2022 for Italian Patent Application No. 202100017498.
(Continued)

*Primary Examiner* — Stephen E. Jones
(74) *Attorney, Agent, or Firm* — McCarter & English, LLP

(57) ABSTRACT

A fully-reconfigurable coaxial filter is provided that includes coaxial resonators mounted such that both opposite ends are coupleable to corresponding tuners, first tuners made of dielectric material, each first tuner being slidably mounted at a first end of a corresponding coaxial resonator to be movable relative to the first end to form a dielectric of a capacitive load, and second tuners made of dielectric material, each second tuner being slidably mounted at a second end of a corresponding coaxial resonator to be movable relative to the second end to form a dielectric of a capacitive load associated with the second end of the corresponding coaxial resonator. The first and second tuners are movable relative to the corresponding coaxial resonator so as to tune
(Continued)

the capacitive loads associated with the opposite ends of the coaxial resonator and, resultingly, a resonant frequency and mutual coupling coefficient of the coaxial resonator.

7 Claims, 3 Drawing Sheets

(51) Int. Cl.
*H01P 1/205* (2006.01)
*H01P 7/04* (2006.01)

(58) Field of Classification Search
USPC .......................................................... 333/207
See application file for complete search history.

(56) References Cited

U.S. PATENT DOCUMENTS

| | | | |
|---|---|---|---|
| 8,410,872 | B2 | 4/2013 | Uhm et al. |
| 2006/0139128 | A1 * | 6/2006 | Ala-Kojola ........... H01P 1/2053 333/207 |
| 2017/0084972 | A1 | 3/2017 | Niiranen |
| 2017/0250678 | A1 | 8/2017 | Juntunen et al. |
| 2017/0263992 | A1 | 9/2017 | Nita et al. |

OTHER PUBLICATIONS

PCT International Search Report and Written Opinion dated Sep. 29, 2022 for PCT Application No. PCT/IB2022/056150.
PCT/IB2022/056150, Jul. 1, 2022, WO 2023/275844A1 published Jan. 5, 2023.

* cited by examiner

FULLY-RECONFIGURABLE COAXIAL FILTER

CROSS-REFERENCE TO RELATED APPLICATIONS

This Patent Application is a 35 U.S.C. § 371 National Stage filing of International Application No. PCT/IB2022/056150 filed Jul. 1, 2022, which claims priority from Italian Patent Application No. 102021000017498 filed on Jul. 2, 2021, the entire disclosure of which is incorporated herein by reference.

TECHNICAL FIELD OF THE INVENTION

The present invention relates, in general, to coaxial filters, in particular fully-reconfigurable coaxial filters operating at low frequencies, e.g., in the L-band; therefore, the present invention refers in particular to microwave filters. Without any loss of generality, the present invention relates to a fully-reconfigurable coaxial filter for high power applications, even more in particular for space application, in particular for, e.g., the development of the in-orbit reconfigurable payloads envisaged by the European Space Agency (ESA) for the next generation satellites.

STATE OF THE ART

As is known, in the past years, flexible satellite payloads have been found considerably interesting, since they have the potential to adapt the capacity (i.e., their bandwidth) of communication channels in response to traffic variability. This is particularly interesting for space applications, e.g. for satellites. According to the Statement of Work of ESA Study "*Next generation RF technologies for affordable space-based PNT space segment*", the next generation PNT satellite payloads will require microwave L-band filters, allowing reconfigurability of the central frequency in the range of 1140-1240 MHz and of the frequency bandwidth in the range of 25-50 MHz. Furthermore, these filters will have to withstand a relative high power level (higher than 100 W) and to exhibit a low insertion loss. Additionally, these filters have to satisfy strict safety requirements versus the severe dynamic loads of a rocket launch.

Microwave filters have been recently and frequently considered the bottleneck in conventional payload architectures; in particular, in space applications, microwave filters do not allow in-orbit reconfiguration of the frequency bandwidth or of the central frequency. This limitation applies to several kind of satellite services operating at several different frequency bands.

Therefore, it is felt the need to provide tunable microwave filters, in particular for space application, that solve the abovementioned issues.

As a preliminary consideration, according to a broad classification, the tunable filters may be separated according to the control mechanism type, i.e. electrical or mechanical. In particular, tunable filters having an electrical type control system comprise tunable filters based on of varactor diodes (which modify an electrical capacity) or on ferrite devices (which act on the magnetic field components generated in use). However, these type of tunable filters have a relatively high RF (Radio Frequency) losses and low power handling and they are affected by the emission of intermodulation products due to the intrinsic non-linearity of the active devices, i.e. the varactor diodes or the ferrite devices. On the other hand, the tunable filters having a mechanical type control system comprise tunable filters based on a mechanical actuators, which are better suited to achieve a high power handling and low RF losses; however, these type of tunable filters cannot provide, at the same time, a wide tunability of central frequency and bandwidth, a sufficient mechanical robustness and a small envelope at low frequencies.

Thus, several solutions have been proposed to address the issue of the design of tunable microwave filters at several different frequencies.

In particular, the article "*Continuous Frequency and Bandwidth Tunable Combline Cavity Bandpass Filters with Internally Mounted Motors*" by J. S. Parish, Somjit N. and Hunter I. C. discloses a tunable filter 1 comprising coaxial resonators 2, 3, arranged at a distance d so as to be adjacent with each other, wherein the electromagnetic coupling between adjacent coaxial resonators 2, 3 is controlled through the rotation of a plate 4 made of metal (shown in FIG. 1), interposed between the coaxial resonators 2, 3 and suspended by a dielectric support 5; in particular, the plate 4 may be, e.g., arranged to be in a central position with respect to the coaxial resonators, 2, 3, i.e. approximately at a distance d/2 from each coaxial resonator 2, 3. However, the tunable filter 1 is unable to handle a high power level due to the small gaps (i.e. distances d/2) between the rotating plate 4 and the nearby coaxial resonators 2, 3, which are critical zones for the breakdown discharge under multipaction (or corona) conditions. Furthermore the tunable filter 1 has a high sensitivity of the frequency response versus the rotation angle; in particular, for a precise control of the frequency response, it is required to use mechanical actuators with a high accuracy and to assure a high stability of the mechanical positions versus the environmental conditions, thereby incrementing the manufacturing cost and the complexity of the tunable filter 1. The rotating plate 4 shown in FIG. 1 is furthermore not suited to assure such a good mechanical stability; this problem is particularly important to consider in space applications due to the severe dynamic loads during rocket launches.

Furthermore, the article "*Novel tunable high Q filter design for branching networks with extreme narrowband channels at mm-wave frequencies*" by U. Rosenberg and M. Knipp discloses a filter configuration which can provide a full reconfigurability of the central frequency and of the bandwidth and has low RF losses. According to this article, the resonant frequencies and the coupling coefficients between adjacent waveguide coaxial resonators are regulated through the displacement of metallic walls with sliding contacts located at both ends of each coaxial resonator. However, the solution proposed by the abovementioned article can only be applied to waveguide filters (for instance, as also disclosed in the same article, a dual mode waveguide filter) which are too bulky, i.e. have a bigger envelope, at low frequencies such as in the L-band.

A further example of a known filter is a comb-line filter 10, schematically shown in FIG. 2 and comprising a number of coaxial resonators 11; in particular, each coaxial resonator 11 is connected and supported at a first end by a housing 12 of metal and is arranged at a distance d' along a X axis of a Cartesian reference system XYZ from adjacent coaxial resonators 11. In addition, each coaxial resonator 11 is the inner conductor of a corresponding coaxial line; thus, for the sake of simplicity and for allowing a better comprehension of the invention, the outer conductor (represented, e.g., by an outer cover) is omitted from FIG. 2. Furthermore, the housing 12 delimits a filter cavity 13, wherein the plurality of coaxial resonators 11 extends. Additionally, each coaxial resonator 11 faces a corresponding opening 14 at a second end, opposite to the first end along a Y axis of the Cartesian reference system XYZ; in particular, each opening 14 is configured to receive a corresponding tuning screw 15 and to be coupled to a corresponding bolt 16. In addition, the comb-line filter 10 also comprises tapping lines 17 configured to supply power to the comb-line filter 10 itself when in use, to which they are connected, and which are inserted in the filter cavity 13 through respective connection tubes 19. In particular, the tapping lines 17 are connected to the first and last coaxial resonators 11 of the number of coaxial resonators 11, i.e. the coaxial resonators 11 which are adjacent to the connection tubes 19 and are parallel to respective lateral walls of the housing 12 (i.e., parallel to the Y axis).

The electromagnetic coupling between adjacent coaxial resonators 11 is determined as the superposition of an inductive term and a capacitive term with opposite signs, the sum of which determines a coupling value. The two terms have an equal magnitude and cancel out when the length of each coaxial resonator 11 is equal to a quarter of wavelength 2. In order to ensure that the coupling value is not null, the coaxial line of each coaxial resonator 11 terminates with respective capacitive loads (thereby replacing an open circuit condition) and are shortened so that the length of each coaxial resonator 11 is less than a quarter of wavelength 2. In the comb-line implementation of FIG. 2, the capacitive loads are created by a fringing electric field E in small gaps between the tip of each second end of a respective coaxial resonator 11 and the tip of the corresponding tuning screw 15; in other words, the capacitive load of each coaxial resonator 11 is created at the second end of the corresponding coaxial resonator 11 and its value is tuned by screwing or unscrewing each screw 15 (and, thus, reducing or increasing the space between the second end of each coaxial resonator 11 with the tip of the associated tuning screw 15). Therefore, the introduction of the capacitive loads leads to a decrease of the capacitive term of the electromagnetic coupling of the plurality of coaxial resonators 11, thereby generating a non-null electromagnetic coupling (i.e., a non-null coupling value) by the unbalance of the inductive and capacitive terms.

It is furthermore noted that the capacitive loads may be enhanced through the insertion of dielectric elements, in particular with a relatively high dielectric constant, at the ends of the coaxial lines of each coaxial resonator 11. Variable capacitive loads may also be implemented using movable dielectric tuners protruding into the filter cavity 13 from the top wall of the housing 12; in the latter case, the insertion or release of the dielectric tuners (not shown) into the openings 14 allows to obtain said variable capacitive loads.

Thus, an increase of the capacitive loading associated with a couple of adjacent coaxial resonators 11 leads to an increase of their electromagnetic coupling; however, this mechanism alone may not be used to tune the filter bandwidth because, at the same time, it produces a strong variation of the resonant frequencies of each coaxial resonator 11.

EP 3 667 810 A1 discloses a filter device including a plurality of low-band resonators and a plurality of high-band resonators.

US 2017/084972 A1 discloses an RF filter, particularly a stripline type RF filter, including a casing and two or more strip-conductor-type resonators in the casing. At a distance from the ends of the resonator, between the resonator sides, there are one or more coupling lines forming an integral piece with the resonators.

US 2017/250678 A1 discloses a method including: obtaining information indicating at least one reference characteristic; obtaining input data, the input data relating to the output of the tunable filter; determining, based on the input data, at least one characteristic of the tunable filter; upon detecting that the at least one determined characteristic does not match with the at least one reference characteristic, determining tuning instructions for the tunable filter; and applying the tuning instructions in adjusting the tunable filter.

US 2017/263992 A1 discloses a coaxial filter having a frame construction comprising at least one filter frame, which consists of an electrically conductive medium and comprises a receiving space. At least one first resonator internal conductor is arranged in the receiving space. The at least one first resonator internal conductor is galvanically connected to a face of the at least one electrically conductive filter frame, and extends therefrom in the direction of another, in particular opposing face of the electrically conductive filter frame, and ends at a distance from the opposing face of the electrically conductive filter frame and/or is galvanically separated from the opposing face of the electrically conductive filter frame.

OBJECT AND SUMMARY OF THE INVENTION

In view of the foregoing, the Applicant has felt the need to solve the issues of the prior art, in particular to meet the requirements of the Statement of Work of ESA Study "*Next generation RF technologies for affordable space-based PNT space segment*", thereby to improve the structure and the performances of current filters for space applications.

In further detail, the Applicant, having noted that the cited prior art documents, aims at providing a filter, in particular a coaxial filter, being compact (i.e., having a small envelope with respect to the known prior art), low insertion loss, relatively high power handling and thus good performances at low frequencies.

Thence, object of the present invention is that of providing a fully-reconfigurable coaxial filter that solves the issues of the prior art.

This and other objects are achieved by the present invention in that it relates to a fully-reconfigurable coaxial filter, as defined in the attached claims.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The present invention will now be described in detail with reference to the attached figures to allow a skilled person to make and use it. Various modifications to the embodiments described will be immediately apparent to skilled person and the generic principles described can be applied to other embodiments and applications without thereby departing from the scope of the present invention, as defined in the attached claims. Therefore, the present invention should not be considered limited to the embodiments described and illustrated herein, but should be accorded the broadest scope of protection consistent with the described and claimed features.

Unless otherwise defined, all technical and scientific terms used herein have the same meaning commonly used by persons of ordinary experience in the field pertaining to the present invention. In the event of a conflict, this description, including the definitions provided, will be binding. Furthermore, the examples are provided for illustrative purposes only and as such should not be regarded as limiting.

In particular, the block diagrams included in the attached figures and described below are not intended as a representation of the structural characteristics, or constructive limitations, but must be interpreted as a representation of functional characteristics, i.e. intrinsic properties of the devices and defined by the effects obtained or functional limitations and which can be implemented in different ways, therefore in order to protect the functionality of the same (possibility of functioning).

In order to facilitate the understanding of the embodiments described herein, reference will be made to some specific embodiments and a specific language will be used to describe them. The terminology used herein has the purpose of describing only a particular embodiment, and is not intended to limit the scope of the present invention.

Figure 4:
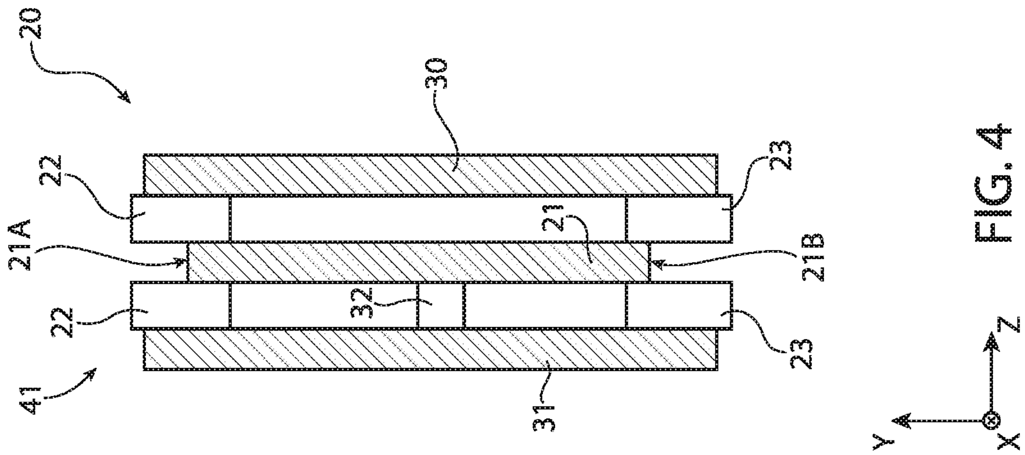
FIG. 4 shows a lateral view taken along section line A in FIG. 3 of the fully-reconfigurable coaxial filter of FIG. 2.
Figure 3:
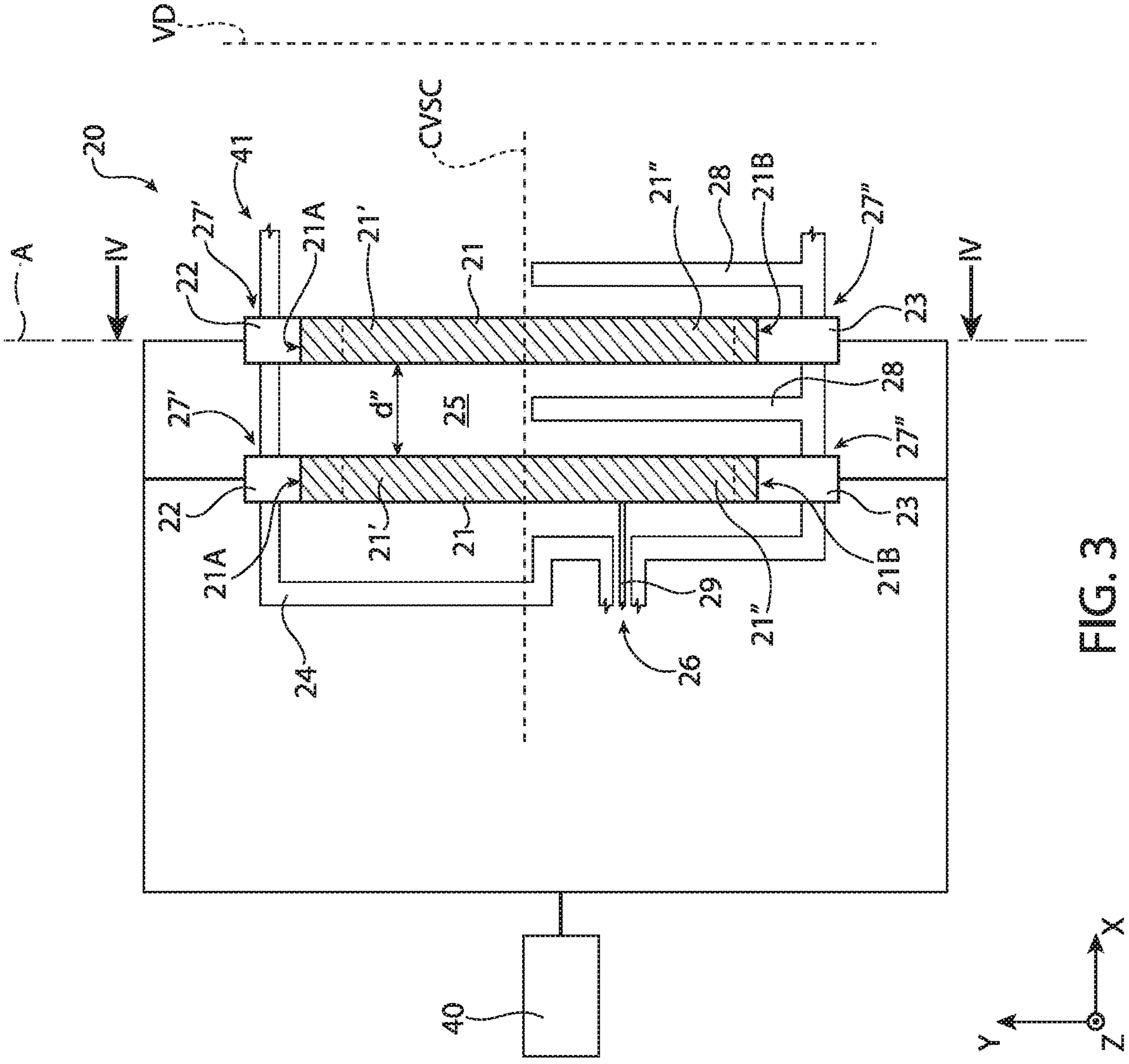
FIG. 3 shows a partial top view of a portion of a fully-configurable coaxial filter with portions in dashed lines according to an embodiment of the present invention.

With joint reference to FIGS. 3 and 4, the present invention concerns a mechanically tunable fully-reconfigurable coaxial filter 20 based on movable dielectrics.

The fully-reconfigurable coaxial filter 20 comprises:

- a number of coaxial resonators 21 each mounted such that both opposite ends 21A, 21B are coupleable to corresponding tuners 22, 23;
- a number of first tuners 22 made of dielectric material, each first tuner 22 is slidably mounted at a first end 21A of a corresponding coaxial resonator 21 to be movable relative to the first end 21A to form a dielectric of a capacitive load associated with the first end 21A of the corresponding coaxial resonator 21; and
- a number of second tuners 23 made of dielectric material, each second tuner 23 is slidably mounted at a second end 21B, opposite to the first open end 21A, of a corresponding coaxial resonator 21 to be movable relative to the second end 21B to form a dielectric of a capacitive load associated with the second end 21B of the corresponding coaxial resonator 21.

The first and second tuners 22, 23 are movable relative to the corresponding coaxial resonator 21 so as to tune the capacitive loads associated with the opposite ends 21A, 21B of the coaxial resonator 21 and, resultingly, a resonant frequency and a mutual coupling coefficient of the coaxial resonator 21.

In particular, the first and second tuners 22, 23 are configured to move along a vertical line VD, parallel to a Y axis of a Cartesian reference system XYZ, with respect to the coaxial resonators 21 cither on the same or opposite direction so as to vary the values of the capacitive loads at both ends 21A, 21B of the coaxial resonators 21 to tune corresponding values of the resonant frequency and the mutual coupling coefficient of the coaxial resonators 21.

According to an aspect of the present invention, the first and second tuners 22, 23 are designed to be coupleable to an actuator arrangement 40 operable to move the first and second tuners 22, 23 relative to the corresponding coaxial resonator 21, either in one and the same direction or in opposite directions, and either independently or dependently.

As shown in FIG. 3, each coaxial resonator 21 is arranged at a distance d" to adjacent coaxial resonators 21.

Furthermore, each coaxial resonator 21 is a half-wave-length coaxial resonator formed by two series-connected quarter-wavelength coaxial resonators (hereinafter also referred to as upper and lower quarter wave sections 21', 21" respectively), at least one of which is electrically shielded from quarter-wavelength coaxial resonators of adjacent coaxial resonators 21. In further detail, according to an aspect of the present invention, the lower quarter wave section 21" of each coaxial resonator 21 is electrically shielded from adjacent lower quarter wave section 21" of adjacent coaxial resonators 21; furthermore, the upper quarter wave section 21' of each resonator 21 is electromagnetically coupled to adjacent upper quarter wave sections 21' of adjacent resonators 21.

The upper and lower quarter wave sections 21', 21" are mutually coupled to form a virtual short circuit plane CVSC, the latter parallel to a XZ plane of the Cartesian reference system XYZ. Thus, the upper quarter wave section 21' of each coaxial resonator 21 extends above the virtual short circuit plane CVSC and forms, at the first end 21A, a corresponding capacitive load with the corresponding first tuner 22 and the lower quarter wave section 21" of each coaxial resonator 21 extends below the virtual short circuit plane CVSC and forms, at the second end 21B, a corresponding capacitive load with the corresponding second tuner 23.

According to an aspect of the present invention, the coaxial resonators 21 are made of metal, e.g. aluminum alloy, Kovar (i.e., nickel-cobalt ferrous alloys) or Invar (i.e., nickel-iron alloys); the choice of the metal for the coaxial resonators 21 depends on the mechanical and/or thermal requirements for the chosen application.

The fully-reconfigurable filter 20 further comprises:

- a housing 41 internally delimiting a filter cavity 25 accommodating the number of coaxial resonators 21;
- a number of first through openings 27', one for each first tuner 22, formed in the housing 41, each first opening 27' is formed in a position facing a corresponding first tuner 22 to allow the first tuner 22 to be coupled to the actuator arrangement 40; and
- a number of second through openings 27", one for each second tuner 23, formed in the housing 41, each second opening 27" is formed in a position facing a corresponding second tuner 23 to allow the second tuner 23 to be coupled to the actuator arrangement 40.

The fully-reconfigurable coaxial filter 20, in particular the housing 41, further comprises a number of combs 28 (two shown in FIG. 3) interposed between adjacent coaxial resonators 21; in particular, the combs 28 are configured to enforce an electrical shielding between adjacent resonators 21, in particular between the lower quarter wave sections 21" of adjacent coaxial resonators 21 while allowing an electromagnetic coupling between the upper quarter wave sections 21' of adjacent coaxial resonators 21.

The fully-reconfigurable coaxial filter 20 further comprises:

an input port 26 formed in the housing 41 and comprising a tapping line 29 coupled to an input coaxial resonator 21; and an output port (not shown in FIG. 3 and hereinafter referred with the same reference number as the input port 26, i.e. 26) formed in the housing 41 and comprising a tapping line (not shown in FIG. 3 and hereinafter referred with the same reference number as the tapping line 29, i.e. 29) coupled to an output coaxial resonator 21;

In particular, the input and output ports 26 are arranged below the virtual short circuit planes CVSC of the input and output coaxial resonators 21.

In particular, according to an aspect of the present invention, the input and output coaxial resonators 21 are the first and last coaxial resonators 21 of the number of coaxial resonators 21 and thus are adjacent to lateral walls (i.e., walls parallel to the Y axis) of the housing 41.

Furthermore, the port 26, the tapping lines 29 and the corresponding coaxial resonators 21 are magnetically coupled with each other. In addition, the tapping lines 29 are coupled to the lower quarter wave section 21" of the corresponding coaxial resonator 21 and the movement of the first and second tuners 22, 23 with respect to the coaxial resonators 21 along the vertical line VD also varies the vertical (i.e., along the Y axis) position of the virtual short circuit plane CVSC; consequently, the value of the coupling coefficient between the ports 26 and the corresponding coaxial resonators 21 varies with the vertical position of the virtual short circuit plane CVSC. Furthermore, a variation of the vertical position of the virtual short circuit plane CVSC is associated with a variation of the vertical position of an associated electrical resonant field, which varies in accordance with the variation of the vertical position of the virtual short circuit plane CVSC.

It is also noted that each virtual short circuit plane CVSC is defined by a corresponding line parallel to the X axis of the Cartesian reference system XYZ.

Furthermore, the position along the Y axis of each virtual short circuit plane CVSC is controlled by the movement of the corresponding tuners 22, 23 when the fully-reconfigurable coaxial filter 20 is in use. In particular, when in use, the input coaxial resonator 21 and the input port 26 define a magnetic loop and, thus, are coupled with each other; the coupling between the input coaxial resonator 21 and the input port 26, and, thus, the corresponding tapping line 29 is also defined as input coupling. Analogously, when in use, the output coaxial resonator 21 and the output port 26 define a magnetic loop and, thus, are coupled with each other, thereby defining an output coupling between the output coaxial resonator 21 and the output port 26, and, thus, the corresponding tapping line 29. According to an aspect of the invention, by arranging the input port 26 and the tapping lines 29 below the virtual short circuit plane CVSC, the variation of the input coupling between the input coaxial resonator 21 and the input port 26 is produced by a displacement of the first and second tuners 22, 23 coupled to the input coaxial resonator 26 and has the same sign as the variation of the coupling between the input coaxial resonator 26 and the adjacent coaxial resonator 21; according to an aspect of the present invention, this coherence regarding the variation of the input coupling and the variation of inter-resonator coupling allows to ensure a proper tuning of the filter bandwidth. In fact, according to the principles of filter theory, in order to increase (or decrease) the filter bandwidths of the fully-reconfigurable coaxial filter 20, according to an aspect of the present invention, a coherent variation (i.e., with the same sign) of all the coupling coefficients, i.e. of the internal inter couplings between the coaxial resonators 21 and the corresponding external couplings, i.e., the input coupling and the output coupling is required. In particular, the considerations made for the input coupling are also valid for the output coupling.

The housing 41 further comprises:

a frame 24; and first and second covers 30, 31 coupled to the frame 24 on opposite faces thereof.

In particular, the coaxial resonators 21 are arranged side by side in the frame 24 on a plane parallel to the first and second covers 30, 31 (i.e. respective planes parallel to the XY plane) and are supported by the first and second covers 30, 31 via at least one support 32; in the present embodiment, the fully-reconfigurable coaxial filter 20 comprises one support 32. Furthermore, as shown in FIG. 4, the first and second tuners 22, 23 are arranged between the corresponding coaxial resonators 21 and the first and second covers 30, 31.

Thus, the first and a second covers 30, 31 which are made of metal (e.g., aluminum alloy, Kovar or Invar) cover the coaxial resonators 21 thereby physically shielding them from the external environment. As also shown in FIG. 4, pairs of first tuners 22 and pairs of second tuners 23 are arranged between the respective coaxial resonator 21 and the first and second covers 30, 31 (therefore, along a direction parallel to the X axis) such that the first and second tuners 22, 23 are able to slide along the vertical line VD between the corresponding coaxial resonator 21 and the first and second covers 30, 31, thereby varying the values of the capacitive loads and the value of the coupling between the ports 26 and the corresponding coaxial resonators 21.

According to an aspect of the present invention, each first and second tuners 22, 23 are shaped so as to fill the gaps between each coaxial resonator 21 and the first and second covers 30, 31 along a variable length of the coaxial line of each coaxial resonator 21; in other words, the first and second tuners 22, 23 move along the vertical line VD according to a length suitable for the specific application of the present fully-reconfigurable coaxial filter 20. In particular, as the first and/or second tuners 22, 23 enter into the gap between each coaxial resonator 21 and the covers 30, 31, an increasing terminal part of the associated coaxial line of each coaxial resonator 21 becomes dielectrically filled and its characteristic impedance is decreased, thereby assuring a smooth, almost linear, regulation of the capacitive and inductive loads over a wide tuning range.

Furthermore, the support 32 is of dielectric material and is such that each coaxial resonator 21 is fixed to the first cover 30, i.e. does not move when the first and second tuners 22, 23 are moving in use.

According to an aspect of the present invention, the present fully-reconfigurable coaxial filter 20 is suitable for high power applications, where it is felt the need to transfer the heat generated by the ohmic losses in the central portion of conductors to housings enclosing the latter. For this reason, the material forming the support 32 is chosen so as to be suitable for such operation; thus, the support 32 is made, e.g., of AlN, which is characterized by a good thermal conductivity (about 170 W/mK) and also quite low dielectric losses. Further suitable materials are, e.g., Shapal Hi-M Soft™, which are easier to machine and have a lower thermal conductivity.

Furthermore, according to a further aspect of the present invention, with reference to FIG. 4, the support 32 is placed centrally with respect to the respective coaxial resonators 21; therefore, the support 32 is placed approximately on the line defining the virtual short circuit plane CVSC, where the electric field E is minimum. In this way, the electric losses inside of the dielectric support can be minimized.

Figure 2:
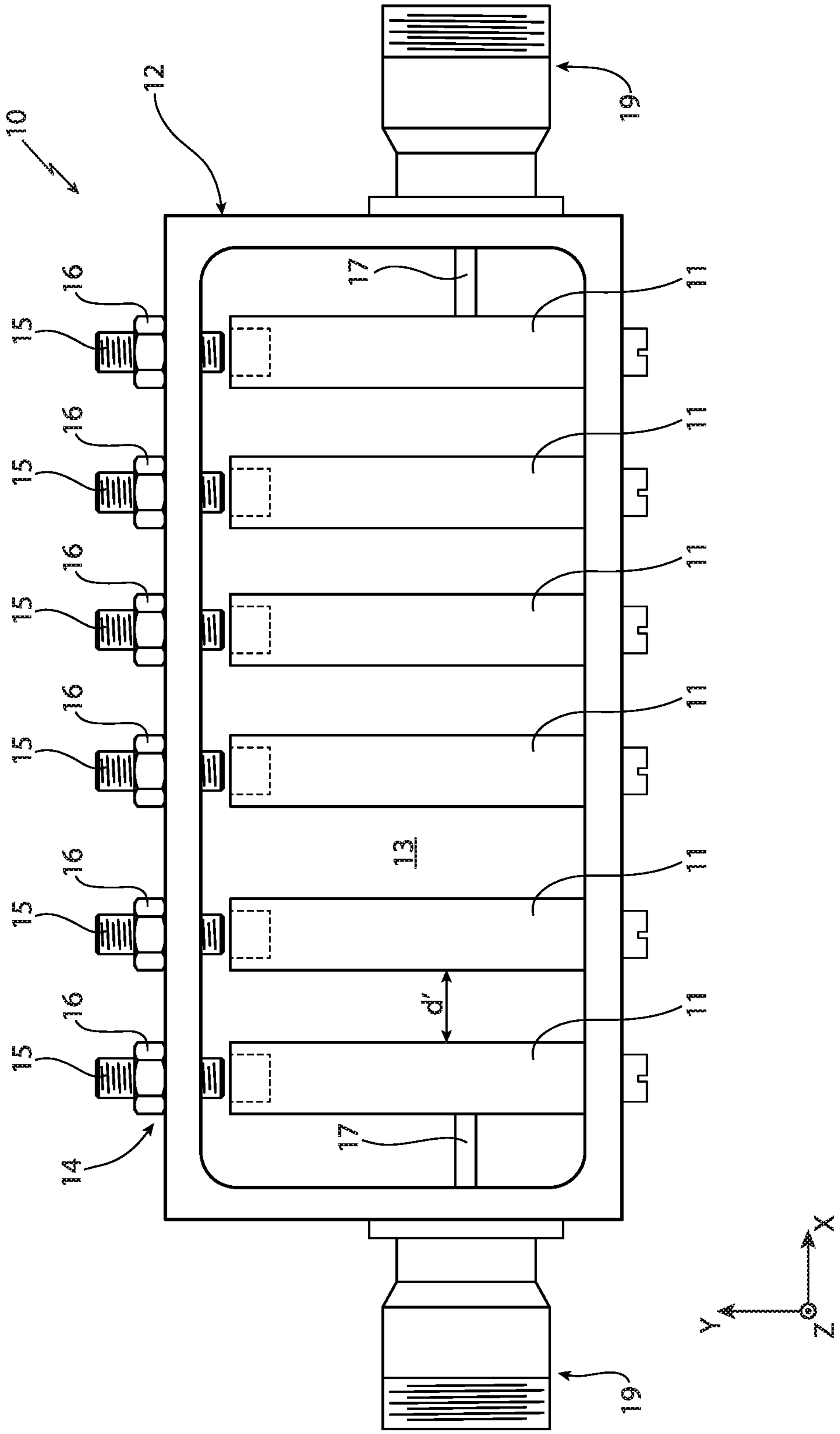
FIG. 2 shows a partial top view of a comb-line filter according to the prior art.

As stated above with reference to FIG. 3, the coaxial resonators 21 are half-wavelength coaxial resonators; with respect to the conventional comb-line filter of FIG. 2, each coaxial resonator 21 of the fully-reconfigurable coaxial filter 20 adds a quarter-wavelength line (i.e., the lower quarter wave section 21") terminating in an open circuit at the second end 21B, thereby removing the short circuit placed, in the comb-line configuration of FIG. 2, at the first end of each coaxial resonators 11, i.e. at the bottom end of each coaxial resonator 11. Thus, each coaxial resonator 21 is longer than the corresponding coaxial resonator 11 of FIG. 2 and form an open circuit at the second end 21B; consequently, the abovementioned quarter-wavelength line acts, in a first approximation, as an impedance inverter which transforms the tunable capacitive load into a tunable inductive load placed at the virtual short circuit plane CVSC. Thus, in principle, the configuration of FIG. 3 with half-wavelength coaxial resonators loaded at both ends with capacitive tuners (i.e., variable capacitive loads between the ends 21A, 21B and the tuners 22, 23) is equivalent to a comb-line coaxial resonator, such as the one shown in FIG. 2, with the bottom short circuits (i.e., at the first ends of the coaxial resonators 11 of FIG. 2) replaced by inductive tuners (i.e., the lower quarter wave sections 21" of the coaxial resonators 21).

Figure 1:
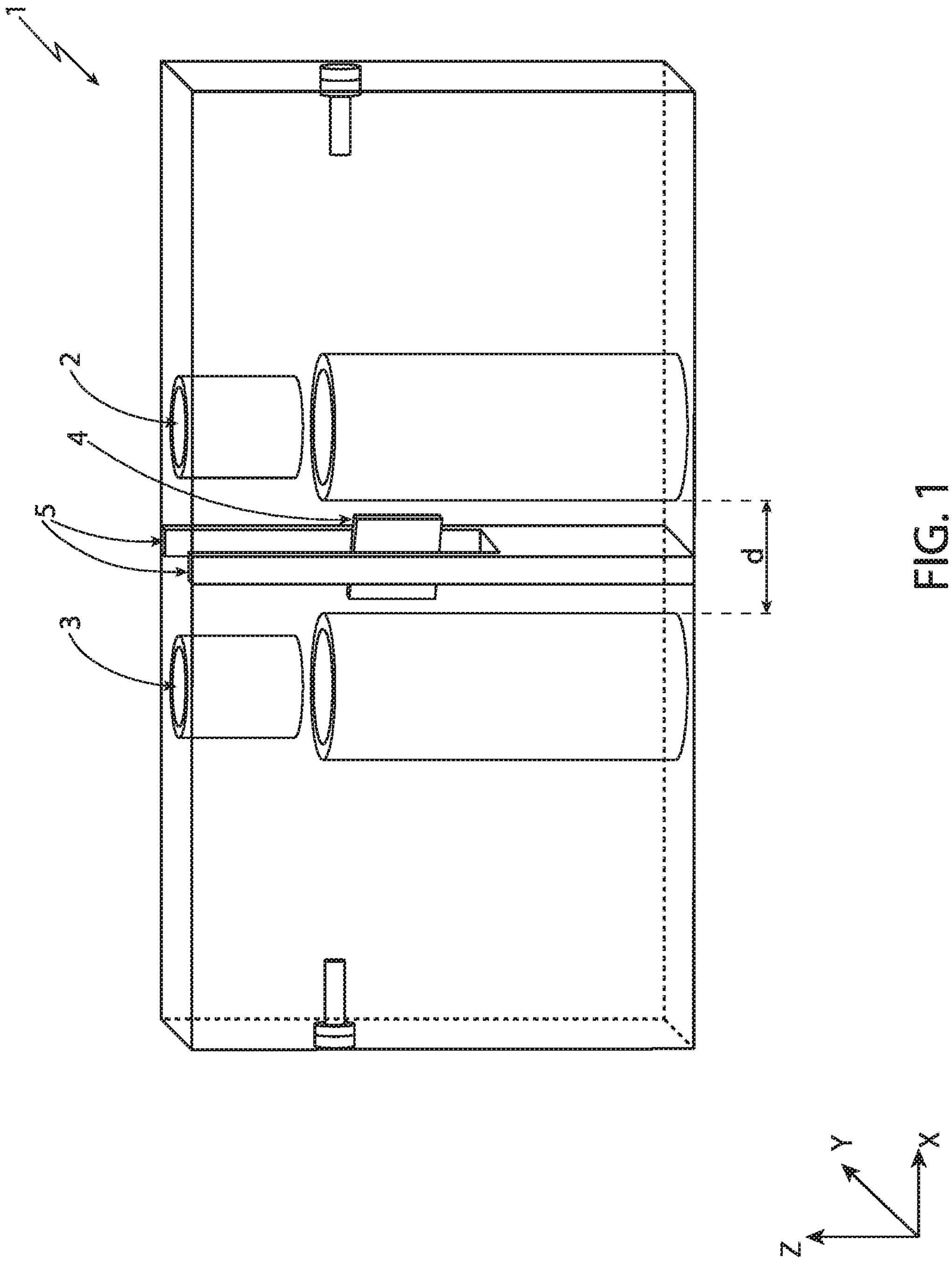
FIG. 1 shows a perspective view of a tunable filter according to the prior art.

As clear from the previous paragraphs, differently from the configuration shown in FIG. 2, the tapping lines 29 and the input and output ports 26 of the fully-reconfigurable coaxial filter 20 of FIG. 1 are moved and connected to the lower quarter wave sections 21" of the input and output coaxial resonators 21. This modification thus ensures a coherent variation of all the coupling coefficients as a consequence of a vertical translation of the virtual short circuit planes of the coaxial resonators 21.

Furthermore, according to an aspect of the present invention, the coupling between adjacent coaxial resonators 21 in the fully-reconfigurable coaxial filter 20 involves only the upper quarter wave sections 21' of the coaxial resonators 21 while the lower quarter wave sections 21" of each coaxial resonator 21 are electrically shielded from adjacent coaxial resonators 21.

The upper part of the fully-reconfigurable coaxial filter 20 (i.e., the portion arranged above the virtual short circuit plane CVSC) is than very similar to the comb-line filter depicted in FIG. 2. The lower part of the fully-reconfigurable coaxial filter 20 (i.e., the portion below arranged below the virtual short circuit plane CVSC) acts as a set of variable inductive loads which replace the fixed short circuits associated with the coaxial resonators 11 of the comb-line filter depicted in FIG. 2.

When in use, the mechanical actuators move the pluralities of first and second tuners 22, 23 along the vertical line VD either on the same or opposite direction. In either way, the vertical displacement of each first and second tuner 22, 23 allow for a complete control of all the relevant filter parameters (namely, internal and external coupling coefficients and resonant frequencies), thereby achieving a good electrical response (i.e., close to the ideal frequency response requested for the fully-reconfigurable coaxial filter 20 for, e.g., space applications) for all the relevant settings (namely, central frequency and bandwidth) over a wide tuning range. Therefore, a wide tunability is achieved without sacrificing the power handling, the low insertion loss and the compactness which are typical of a fixed, non-reconfigurable coaxial filter such as the one shown in FIG. 2.

In particular, according to a first mode of the present invention (shown in FIG. 3), wherein the first and the second tuners 22, 23 are moved along the vertical line VD and in the same direction, i.e., from the top to the bottom walls of the frame 24, as shown in FIG. 3), the Applicant has verified that the configuration of FIGS. 3 and 4 of the present fully-reconfigurable coaxial filter 20 allows, when in use, an increase of the capacitive load associated with the first end 21A and a decrease of the capacitive load associated with the second end 21B, thereby increasing the value of the amplitude of the corresponding coupling coefficient of each coaxial resonator 21 and preserving the value of the resonant frequency of each coaxial resonator 21.

Accordingly, an opposite variation of the capacitive loads applied to the two resonator ends which preserves the resonant frequencies is obtained by lowering the positions of the first and second tuners 22, 23 (i.e., towards the bottom wall of the housing 41) with respect to their starting positions (shown in FIG. 4) along the vertical line VD; in particular, each first tuner 22 is configured to enter a respective first opening 27', while each second tuner 23 is configured to exit a respective second opening 27".

A small relative variation of the value of either the capacitive or the inductive electromagnetic couplings generates a considerable variation of the total coupling. Thanks to this, the tuning mechanism characterizing the present fully-reconfigurable coaxial filter 20 provides an effective mean to control the amplitude of the coupling coefficients.

Furthermore, the Applicant has noted that this variation of the capacitive loads at the ends 21A, 21B of the coaxial resonators 21 corresponds to a corresponding displacement in the opposite direction (i.e., upwards, towards the top wall of the housing 41) of virtual short circuits associated with each coaxial resonator 21 . . . said displacement of the virtual short circuits, i.e. of the position of the virtual short circuit planes CVSC, leads also to an increase of the input coupling due to the incremented distance between the virtual short circuits associated with each coaxial resonator 21 and a tapping point, i.e. the connection points between the input and output coaxial resonators 21 with the respective tapping lines 29.

According to a second mode of the present invention, the first and the second tuners 22, 23 are configured to move along the vertical line VD and in opposite directions so as to increase both the capacitive loads at the ends 21A, 21B of the coaxial resonators 21 thereby modifying the value of the resonant frequency and preserving the value of the amplitude of the corresponding coupling coefficient of each coaxial resonator 21. Thus, the Applicant has verified that, by applying a coherent variation of the capacitive loads (i.e. by moving the first and the second tuners 22, 23 along the vertical line VD but in opposite directions, thereby moving the first tuners 22 toward the bottom wall of the housing 41 and the second tuners 23 toward the top wall of the housing 41), the present fully-reconfigurable coaxial filter 20 allows to change the resonant frequencies of the coaxial resonators 21 without affecting the amplitude of the coupling coefficients.

The superposition of the two types of displacements (either in the same or in the opposite directions) of the first and second tunable capacitive loads at the ends 21A, 21B of the coaxial resonators 21, in the present fully-reconfigurable coaxial filter 20 allows a complete control of the coupling coefficients and of the resonant frequencies coaxial resonator.

It is furthermore noted that, in a symmetric in-line filter of any odd order N obtained through the configuration shown in FIGS. 3 and 4, there are (N+1)/2 independent coupling coefficients (one external coupling coefficient and (N−1)/2 internal coupling coefficients). (N+1)/2 is also the number of the independent opposite variations of the capacitive loads at the ends of the respective coaxial resonators, which ensure a full control of the coupling coefficients associated with that in-line filter.

Furthermore, in a symmetric in-line filter of any odd order N, there are (N+1)/2 independent resonant frequencies. (N+1)/2 is also the number of the independent coherent variations of the capacitive loads at the ends of the respective coaxial resonators, thereby assuring a full control of the coaxial resonator frequencies. Consequently, considering the above mentioned fully-reconfigurable coaxial filter 20, a symmetric coaxial filter of any odd order provides the full tunability of all the circuit parameters, that is of all the coupling coefficients (internal and external) and of all the resonant frequencies.

From the foregoing, the technical advantages and the innovative features of the present invention are immediately clear to those skilled in the art.

In particular, the present fully-reconfigurable coaxial filter 20 provides a full tunability of all the circuit parameters, specifically the coupling coefficients (internal and external) and the resonant frequencies of the coaxial resonators 21. Thanks to this complete control, the present fully-reconfigurable coaxial filter 20 allows to achieve a good electrical response (i.e., close to the ideal response for of the present fully-reconfigurable coaxial filters 20) for all the relevant settings (i.e., central frequency and bandwidth) over a wide tuning range. This wide tunability is achieved without sacrificing the power handling, the low insertion loss and the compactness which are typical of a fixed, not reconfigurable, coaxial filter.

In other words, the present fully-reconfigurable coaxial filter 20 provides a configuration which is characterized by a wide tunability of central frequency and bandwidth, a high power handling, a low insertion loss and a small envelope, thereby rendering the present fully-reconfigurable coaxial filter 20 suitable for meeting the challenging requirements imposed by the flexible payloads envisaged for the next generation navigation satellites.

Furthermore, the present fully-reconfigurable coaxial filter 20 also provides a configuration which has a relatively high power handling in terms of multipaction discharge, thermal dissipation and PIM (Products of Intermodulation) generation.

In conclusion, it is clear that numerous modifications and variants can be made to the present invention, which fall within the scope of the invention as defined in the attached claims.

The invention claimed is:

1. A fully-reconfigurable coaxial filter (20) comprising:

a number of coaxial resonators (21) each mounted such that both opposite ends (21A, 21B) are coupleable to corresponding tuners (22, 23);

a number of first tuners (22) made of dielectric material, each first tuner (22) is slidably mounted at a first end (21A) of a corresponding coaxial resonator (21) to be movable relative to the first end (21A) to form a dielectric of a capacitive load associated with the first end (21A) of the corresponding coaxial resonator (21); and a number of second tuners (23) made of dielectric material, each second tuner (23) is slidably mounted at a second end (21B), opposite to the first end (21A), of a corresponding coaxial resonator (21) to be movable relative to the second end (21B) to form a dielectric of a capacitive load associated with the second end (21B) of the corresponding coaxial resonator (21);

wherein each coaxial resonator (21) is a half-wavelength coaxial resonator formed by two series-connected quarter-wavelength coaxial resonators (21', 21"), at least one of which is electrically shielded from quarter-wavelength coaxial resonators (21") of adjacent coaxial resonators (21), and wherein the fully-reconfigurable coaxial filter (20) further comprises a number of combs (28) interposed between adjacent coaxial resonators (21) and configured to enforce an electrical shielding between quarter-wavelength coaxial resonators (21") of adjacent coaxial resonators (21), and whereby the first and second tuners (22, 23) are movable relative to the corresponding coaxial resonator (21) so as to tune the capacitive loads associated with the opposite ends (21A, 21B) of the coaxial resonator (21) and, resultingly, a resonant frequency and a mutual coupling coefficient of the coaxial resonator (21).

2. The fully-reconfigurable coaxial filter (20) of claim 1, wherein the first and second tuners (22, 23) are designed to be coupleable to an actuator arrangement (40) operable to move the first and second tuners (22, 23) relative to the corresponding resonator (21), either in one and the same direction or in opposite directions, and either independently or dependently.

3. The fully-reconfigurable coaxial filter (20) of claim 2, further comprising:

a housing (41) internally delimiting a filter cavity (25) accommodating the number of coaxial resonators (21);

a number of first through openings (27'), one for each first tuner (22), formed in the housing (41), each first opening (27') is formed in a position facing a corresponding first tuner (22) to allow the first tuner (22) to be coupled to the actuator arrangement (40); and a number of second through openings (27"), one for each second tuner (23), formed in the housing (24, 30, 31), each second opening (27") is formed in a position facing a corresponding second tuner (23) to allow the second tuner (23) to be coupled to the actuator arrangement (40).

4. The fully-reconfigurable coaxial filter (20) of claim 3, further comprising:

an input port (26) formed in the housing (41) and comprising a tapping line (29) coupled to an input coaxial resonator (21); and an output port (26) formed in the housing (41) and comprising a tapping line (29) coupled to an output coaxial resonator (21);

wherein the two-series-connected quarter-wavelength coaxial resonators (21', 21") of each coaxial resonator (21) are coupled to form a virtual short circuit plane (CVSC) and wherein the input and output ports (26) are arranged below virtual short circuit planes (CVSC) of the input and output coaxial resonators (21).

5. The fully-reconfigurable coaxial filter (20) of claim 3, wherein the housing (24) further comprises:

frame (24); and first and second covers (30, 31) coupled to the frame (24) on opposite faces thereof;

wherein the coaxial resonators (21) are arranged side by side in the frame (24) on a plane parallel to the first and second covers (30, 31) and are supported by the first and second covers (30, 31) via at least one support (32);

and wherein the first and second tuners (22, 23) are arranged between the corresponding coaxial resonators (21) and the first and second covers (30, 31).

6. The fully-reconfigurable coaxial filter (20) of claim 5, wherein the at least one support (32) is made of aluminum nitride.

7. An assembly (20, 40) comprising:

the fully-reconfigurable coaxial filter (20) of claim 1; and an actuator arrangement (40) coupled to the first and second tuners (22, 23) and operable to move the first and second tuners (22, 23) relative to the associated coaxial resonators (21).

* * * * *